Sept. 2, 1952 H. W. GOFF 2,609,433

PERFORATING RECORDER SIGNALING DEVICE

Filed May 28, 1947

INVENTOR
H. W. GOFF
BY R. Marino
ATTORNEY

Patented Sept. 2, 1952 2,609,433

UNITED STATES PATENT OFFICE 2,609,433

PERFORATING RECORDER SIGNALING DEVICE

Harold W. Goff, Manhasset, N. Y., assignor to Bell Telephone Laboratories, Incorporated, New York, N. Y., a corporation of New York Application May 28, 1947, Serial No. 750,942

5 Claims. (Cl. 177—311)

This invention relates to recording devices and particularly to devices in which a plurality of similar parts are displaced in combinations to produce records or indications. Many recording devices have a plurality of punches which are operated in combinations to produce corresponding holes or impressions in a record medium, the characteristic configuration of the group of holes or impressions in the record produced by each combination of operated punches indicating a particular digit, letter or character. A recording device of this kind is disclosed in the copending application of W. W. Carpenter, Serial No. 588,401, filed April 14, 1945, now Patent No. 2,583,086. In the Carpenter device two of each group of five adjacent punches are operated to record a character.

In recording devices of this kind, a satisfactory record is produced only if the required number of punches in each group is operated. If, through some fault in the mechanism or controls, more or less than the correct number of punches are operated, the resulting record is meaningless or erroneous.

An object of this invention is to provide a means for indicating the operation of an incorrect number of punches or similar parts. A feature of the invention is the use of magnetic induction to obtain an indication of incorrect operation. Another feature of the invention is a construction which permits said indication to be obtained without imposing appreciable resistance to the operation of the punches.

These and other features of the invention will be apparent from the following description, the appended claims, and the drawings in which:

Figure 1:
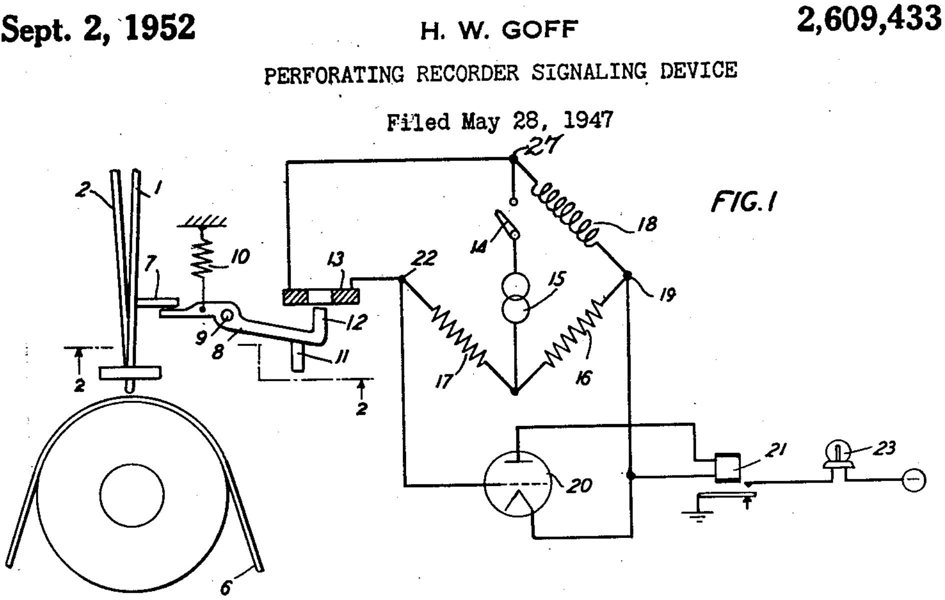
Fig. 1 shows a portion of the recorder and the electrical indicating circuit.
Figure 2:
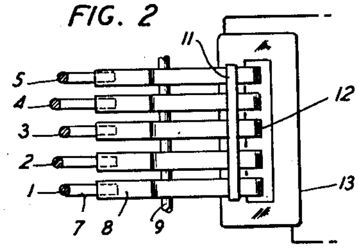
Fig. 2 is a sectional view of the recorder of Fig. 1.

Referring to Figs. 1 and 2; 1, 2, 3, 4 and 5 are punches of the recorder and constitute a group of punches which are normally operated in combinations of two to impress the record tape 6. Each punch, such as punch 1, carries a projection 7 adapted to engage a lever 8 of magnetic material pivoted on a rod 9, one such lever being provided for each punch. Each lever, such as lever 8, is normally held by a spring 10 against a stop 11 so that its projecting end 12 is not within the coil 13, which is large enough for the projecting ends of all the levers to enter it. If any punch, such as punch 1, is depressed to impress the tape 6, the projection 7 of said punch engages lever 8, partly rotating said lever about the pivot 9 so that the projecting end 12 of said lever enters the coil 13.

The circuit shown connected to coil 13 is a typical inductance bridge circuit. When the switch 14 is closed, alternating potential from a source 15 is supplied to the bridge composed of resistances 16 and 17, inductance 18, and coil 13. The resultant potential at terminal 19 of said bridge is applied to the cathode of the triode tube 20 and, through the winding of relay 21, to the anode of said tube. The inductance of relay 21 produces a phase difference between the potentials at the cathode and at the anode of tube 20 so that, at each cycle of alternating potential, a difference of potential exists between said cathode and said anode. The potential at terminal 22 of said bridge is applied to the grid of tube 20. If the value of resistance 16 bears the same proportion to the value of resistance 17 as the value of inductance 18 bears to the inductance of coil 13, the potential at the grid of tube 20 is in phase with the potential at the cathode of said tube, but if said proportion is not maintained, the potentials at said grid and at said cathode are not in phase. The inductance of coil 13 depends upon the reluctance of its magnetic path which is affected by inserting the projecting ends 12 of the levers 8 into said coil. The values of resistances 16 and 17 and inductance 18 are so chosen that the proportion stated above is attained when two of the projecting ends 12 of the levers 8 are inserted in coil 13 and the potential at the grid of tube 20 is sufficiently more negative than the potential at the cathode of said tube to prevent conduction therein.

In operation, switch 14 is arranged to be closed and opened by any suitable means, in timed relation with the movement of the projections 12 of the levers 8, such that the switch is closed after said projections enter the coil 13 and is opened just before they are withdrawn. If, then, two of said punches operate, causing the insertion into coil 13 of two of the projecting ends 12 of the levers 8, tube 20 does not conduct. But if less than two or more than two of said punches operate, inserting one or more than two of the projecting ends 12 of the levers 8 into coil 13, the inductance of coil 13 is not such that the proportion stated above is maintained. A difference of phase then exists between the potential at the grid of tube 20 and the potential at the cathode of said tube and, on alternate cycles of alternating potential from source 15, the grid of tube 20 becomes sufficiently less negative with respect to the cathode of said tube to allow said tube to conduct, operating relay 21. A circuit is thereby closed from battery through lamp 23 and front contacts of relay 21 to ground. Lamp 23 lights and indicates that an incorrect number of punches have operated. Relay 21, in operating, opens its back contacts. Said contacts may be included in any suitable manner in the control circuits of the recorder so that the opening of said contacts arrests further operations of the recorder until the trouble which caused incorrect operation is corrected.

Figure 3:
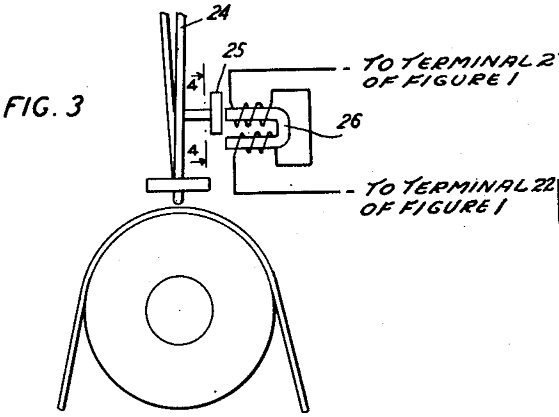
Fig. 3 shows an alternate construction of the recording device.
Figure 4:
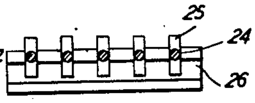
Fig. 4 is a sectional view of the recorder of Fig. 3.

Figs. 3 and 4 show an alternate construction of the recorder in which the indicating devices impose no appreciable resistance to the operation of the punches. Each of the punches, such as punch 24, carries a projection 25 of magnetic material close to the poles of an electromagnet 26. When the punch 24 is depressed, the change of position of the projection 25 in the field of the magnet 26 changes the inductance of said magnet in the same way that the insertion of the projecting end 12 of lever 8 in Figs. 1 and 2 changes the inductance of coil 13. The winding of magnet 26 may be connected to the circuit of Fig. 1 in place of coil 13 as indicated in Fig. 3.

While in the drawings only five punches are shown in each recorder and in the above description it is assumed that two of said punches should be operated to produce a correct record, it is obvious that the invention can be applied equally well to a different number of punches and to recorders in which more or less than two, punches are operated to produce a correct record. Furthermore, since the kind of record made is not pertinent to the invention, it is also obvious that the invention is equally applicable to recorders producing printed records or records of other kinds and to devices other than recorders in which rods, bars or other parts are moved in combination.

What is claimed is:

1. In combination, a plurality of displaceable parts, an alternating-current bridge circuit comprising a source of power, a contact element periodically closed to apply power from said source to said circuit, and a coil inductively responsive to the displacement of one or more of said parts, and means connected to two terminals of said bridge circuit and operative upon a phase difference of potential produced therebetween by the inductive response of said coil to the displacement of other than a predetermined number of said parts.

2. In combination, a plurality of displaceable parts each having a magnetic portion, an alternating-current bridge circuit comprising a source of power, a contact element periodically closed to apply power from said source to said circuit, and a coil adapted to receive the projection of the magnetic portion of each of said parts when displaced, thereby to produce an inductive response of said coil, the intensity of said response depending upon the number of said magnetic portions projected in said coil, and means connected to two terminals of said bridge operative upon a phase difference of potential produced therebetween by the inductive response of said coil when the magnetic portions of other than a predetermined number of displaced parts are projected therein.

3. In combination, a plurality of displaceable parts of magnetic material, an alternating-current bridge circuit comprising a source of power, a contact element periodically closed to apply power from said source to said circuit, and a coil inductively responsive to the displacement of one or more said parts, an electronic device having an electrode connected to one terminal of said bridge circuit and a second electrode connected to another terminal of said bridge circuit, the inductive response of said coil at each cycle of alternating current through said bridge circuit consequent to the displacement of other than a predetermined number of said parts producing a phase difference of potential between said electrodes, and means in the circuit of said electronic device rendered operative upon the conductivity of said device by said difference of potential to indicate the displacement of other than a predetermined number of said parts.

4. In a recording device, a coil, a plurality of punch pins, a pivoted bar for each punch pin, each of said bars having a magnetic portion and each of said bars being severally operable by their respective punch pins to project the magnetic portions thereof within said coil, an alternating-current bridge circuit including said coil, a source of power, a contact element periodically closed to apply power from said source to said circuit, and an electronic device having one electrode connected to one terminal of said bridge circuit and a second electrode connected to another terminal of said bridge circuit, the electrical constants of said bridge circuit being so proportioned that the inductive response of said coil incident to the projection therein of the magnetic portions of a predetermined number of said bars displaced by the involved punch pins produces coincident phase potentials between two said bridge terminals, thereby to maintain said electronic device non-conducting, and the inductive response of said coil incident to the projection therein of the magnetic portions of other than a predetermined number of said bars displaced by involved punch pins produces out-of-phase potentials between two said bridge terminals, thereby to render said electronic device conducting, and means in the conducting path of said electronic device operative upon the conductivity of said device to indicate the displacement of other than a predetermined number of said bars.

5. In a recording device according to claim 4, in which said electronic device comprises a grid, a cathode and an anode, said grid being connected to one terminal of said bridge circuit and said cathode being connected to a second terminal of said bridge circuit, and in which the means in the conducting path of said device comprises a relay connected to the anode and cathode of said device, thereby to form a phase shifting network which, upon each cycle of alternating current through said bridge, is effective to produce a phase difference between the potential at the cathode and the potential at the anode of said electronic device, said relay operating upon the production of a phase difference between the potential at the cathode and potential at the grid of said device.

HAROLD W. GOFF.

REFERENCES CITED

The following references are of record in the file of this patent:

UNITED STATES PATENTS

| Number | Name | Date |
|---|---|---|
| 1,972,985 | Gardner | Sept. 11, 1934 |
| 1,983,388 | Moore | Dec. 4, 1934 |
| 2,165,302 | Rabenda | July 11, 1939 |
| 2,293,708 | Brown | Aug. 25, 1942 |
| 2,366,434 | Brown | Jan. 2, 1945 |
| 2,442,491 | Gieskieng | June 1, 1948 |